(12) United States Patent
Chen et al.

(10) Patent No.: US 6,348,767 B1
(45) Date of Patent: Feb. 19, 2002

(54) ELECTRONIC BALLAST WITH CONTINUED CONDUCTION OF LINE CURRENT

(75) Inventors: Timothy Chen, Germantown, TN (US); Louis R. Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/695,887

(22) Filed: Oct. 25, 2000

(51) Int. Cl.[7] .......................... H02M 7/44; H05B 37/02
(52) U.S. Cl. ..................... 315/224; 315/209 R; 315/244
(58) Field of Search .............................. 315/209 R, 224, 315/225, 219, 291, 244, 307

(56) References Cited

U.S. PATENT DOCUMENTS

| | | | |
|---|---|---|---|
| 5,410,466 A | * | 4/1995 | Maehara ..................... 315/224 |
| 5,945,783 A | * | 8/1999 | Schultz et al. ............... 315/224 |
| 5,965,985 A | | 10/1999 | Nerone .................... 315/209 R |
| 5,994,848 A | | 11/1999 | Janczak ....................... 315/224 |
| 6,144,568 A | * | 11/2000 | Franck et al. ................ 315/224 |

* cited by examiner

Primary Examiner—Don Wong
Assistant Examiner—Wilson Lee

(74) Attorney, Agent, or Firm—Fay, Sharpe, Fagan, Minnich & McKee, LLP

(57) ABSTRACT

An electronic ballast is configured to receive the input from a power source in order to control operation of a lamp connected to the electronic ballast. The ballast includes a positive side bus voltage line and a ground reference line. An input section is connected to the power source, to the positive side bus voltage line and the ground reference line. A complementary pair of switches, connected to bus and to the resonant network, is controlled by a gate drive network. The gate drive network receives feedback signals that is coupled to transformer and controls operation of the set of switches using the received and further processed signals. A triac dimmer is connected between the power source and the input section for providing a dimming capability. A resonant network includes at least a first resonant capacitor connected to the resonant network and to at least one of the positive side bus voltage line and the ground reference line. A second resonant capacitor is connected to the first resonant capacitor and to the input section. At least a portion of resonant current from the second resonant capacitor is applied back to the input section. The portion of resonant current applied back to the input section is sufficient to maintain a minimum triac holding current. In another embodiment of the present invention, a lamp is connected within the ballast circuit such that a portion of its current is also fed to the input circuit.

14 Claims, 6 Drawing Sheets

ELECTRONIC BALLAST WITH CONTINUED CONDUCTION OF LINE CURRENT

BACKGROUND OF THE INVENTION

This invention pertains to an electronic ballast for powering a lamp, and more particularly to a low-cost electronic ballast having low total harmonic distortion (THD) and crest factor with suitable phase control for dimming and which may also have a high power factor. However, it will be appreciated that the invention may be advantageously employed in related lighting environments and applications.

U.S. Pat. No. 5,994,848 generally discloses an electronic ballast system. A power feedback circuit assists in maintaining a level of current drawn from a triac to at least a level of the triac holding current during load-dimming levels. The feedback circuit is fed into a junction joining together a pair of diodes for converting a high-frequency square-wave signal into a unidirectional signal supplied to an inverter. Overboast voltages across a buffer capacitor are minimized during low-dimming levels.

Although the '848 patent provides a proposed solution to supplying triac holding current during low-dimming levels, the circuitry required for operation of the cited patent is complex and involved. Particularly, the driving circuit needs to provide a large dead time between switching elements and a lagging/inductive current in its attempt to maintain a zero-switching voltage. Additionally, the circuit described in '848 over stresses the switching elements at full loads, may under deliver the required holding current at low-dimming levels, and requires the use of a control IC (Integrated Circuit).

Therefore, it is still desirable to develop an electronic ballast that maintains sufficient triac holding current during low dimming levels in an inexpensive, practical manner that is low cost and easily manufacturable. Such a circuit should also be highly reliable.

SUMMARY OF THE INVENTION

An electronic ballast is configured to receive the input from a power source in order to control operation of a lamp connected to the electronic ballast. The ballast includes a positive side bus voltage line and a ground reference line. An input section is connected to the power source, to the positive side bus voltage line and the ground reference line. A complementary pair of switches, connected to bus, ground and to resonant network, is controlled by a gate drive network. The gate drive network receives a feedback signal that is coupled to a transformer and controls operation of the set of switches using the received and further processed signals. A triac dimmer is connected between the power source and the input section for providing a dimming capability. A resonant network includes at least a first resonant capacitor connected to the resonant network and to at least one of the positive side bus voltage line and the ground reference line. A second resonant capacitor is connected to the first resonant capacitor and to the input section. At least a portion of resonant current from the second resonant capacitor is applied back to the input section. The portion of resonant current applied back to the input section is sufficient to maintain a minimum triac holding current. In another embodiment of the present invention, a lamp is connected within the ballast circuit such that a portion of its current is also fed to the input circuit.

DETAILED DESCRIPTION OF THE PREFERRED EMBODIMENTS

Figure 1:
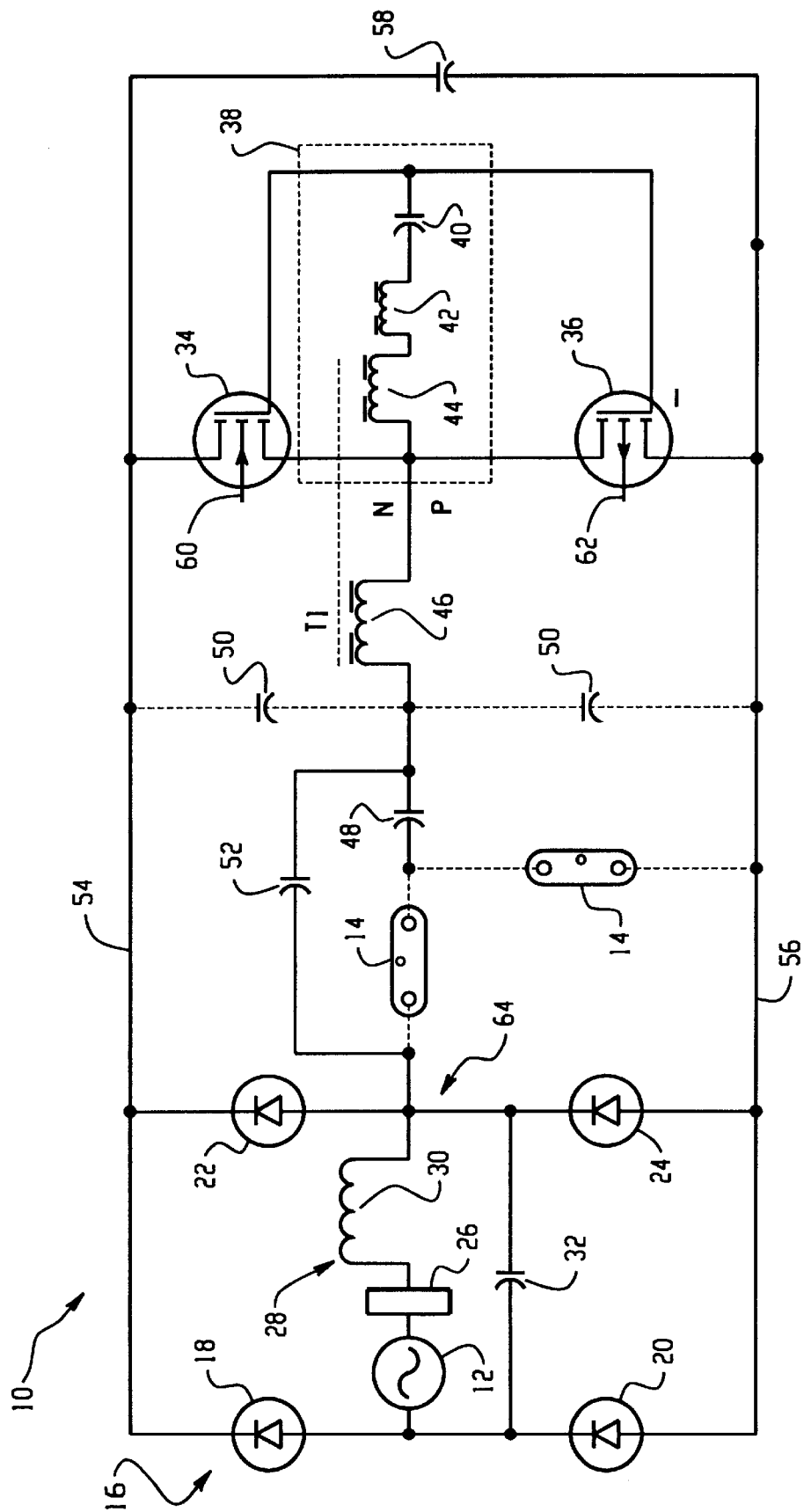
FIG. 1 depicts the essential components of the present invention, wherein the dashed lines illustrate optional configurations.

FIG. 1 sets out an electronic ballast circuit 10 powered by an a.c. input 12 to light and control lamp 14, which may in one embodiment be a gas discharge lamp, such as a compact fluorescent lamp. It is noted that FIG. 1 depicts two configurations of lamp 14 within the present invention. However, in use, only a single lamp is intended to be connected at any one time. Therefore lamp 14 is depicted with dotted lines to show the alternative connection techniques. Input from a.c. source 12 is rectified by rectifier 16 configured by diodes 18–24. Triac dimmer circuit 26, and emi filter 28, comprised of an inductor 30 and capacitor 32, are connected to a.c. source 12 and rectifier 16.

A N/P-channel complimentary pair switching network consisting of switches 34 and 36 is provided and functions in a conventional class D operation mode. The switching network 34, 36 is driven by gate-drive circuit 38, which includes a gate-drive capacitor 40, inductor 42 arrangement, connected to coupled transformer windings 44 and 46. A resonant transistor circuit which determines the resonant switching frequency is determined by the combination of driving capacitor 40, inductor 42, resonant circuit winding 46, feedback winding 44, resonant capacitors 48, 50, 52 as well as lamp 14. It is to be noted that resonant capacitor 50 is shown as being connected to the positive side bus voltage line 54. However, in an alternative embodiment, as shown by the dotted line connection, capacitor 50 could as well be connected to ground reference line 56. Charging capacitor 58 is connected such that it is charged by a.c. source 12 as well as by the resonant feedback current of capacitor 52. Although not shown in FIG. 1, sources 60 and 62 (respectively of switches 34, 36) are connected in a manner well known in the art for operation of a complementary switching converter as taught for example by Nerone, U.S. Pat. No. 5,965,985. Turning more particularly to specific embodiments, attention is drawn to FIG. 2 wherein lamp 14 is shown connected to ground reference line 56. In this embodiment, a resonant capacitor is broken into resonant capacitors 50 and 52. Resonant capacitor 50, again, is shown as being connected either to the positive bus voltage line 54 or to ground reference line 56. The circuit will work efficiently in either arrangement. By splitting resonant capacitance into capacitors 50 and 52, it is possible to connect resonant capacitor 52 to junction 64 located between rectifier diodes 22 and 24. By such an arrangement, a portion of resonant current from the resonant circuit is supplied back to rectifier circuit 16. This forces an input current to be continued above a triac holding current for continued conduction of line current. The foregoing arrangement supplies sufficient current to maintain a minimum triac holding current without introducing large stresses to the resonant circuit and/or to switches 34 and 36. It is to be appreciated that resonant capacitor 52 may alternatively be connected between diodes 18 and 22. The described circuit design eliminates the need for a high cost gate control scheme for maintaining the minimum triac holding current necessary for maintenance of circuit operation.

Figure 3:
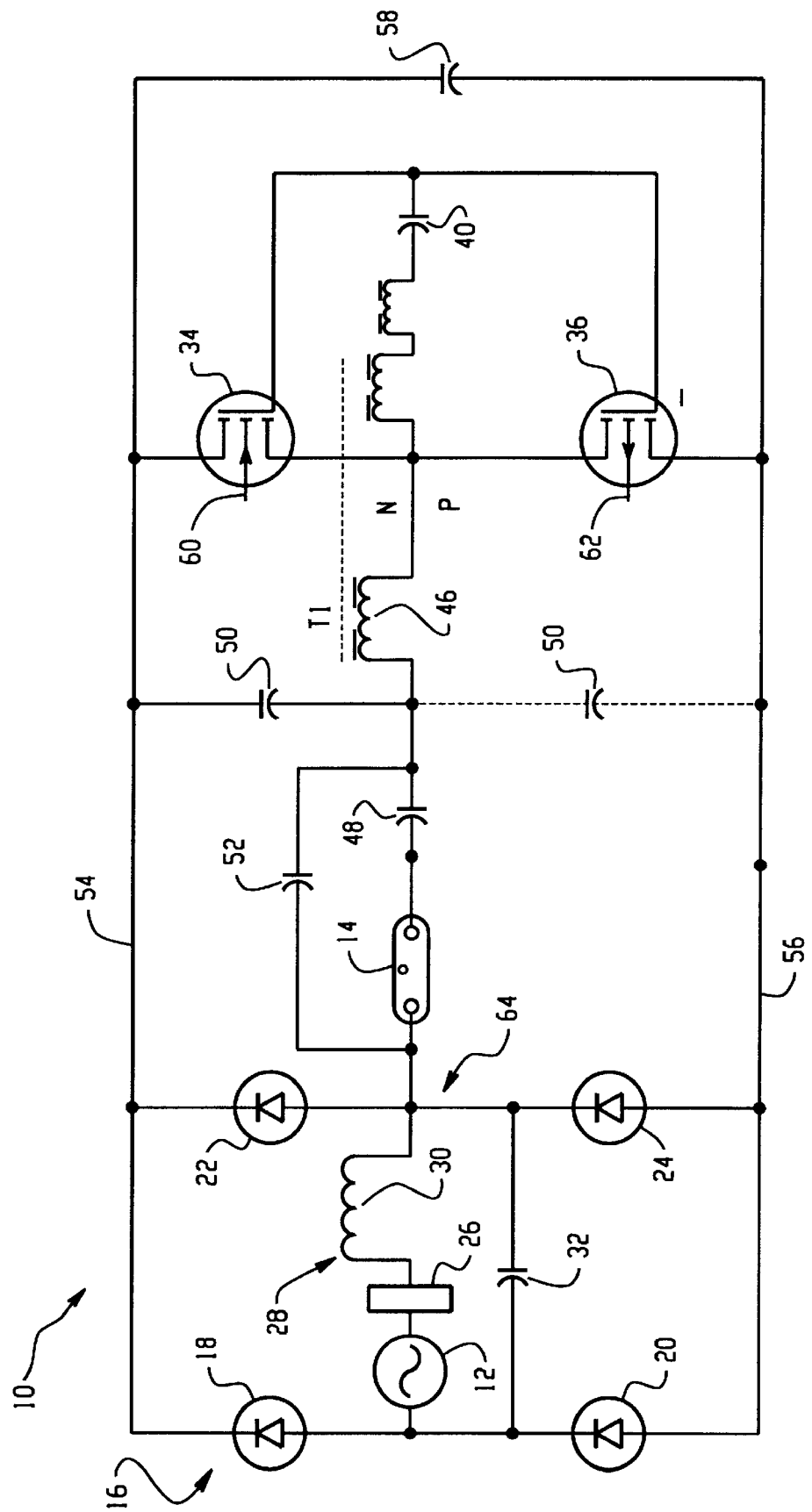
FIG. 3 depicts a second embodiment of the present invention wherein the lamp is connected to the rectifier input.

FIG. 3 is an embodiment where lamp 14 is no longer connected to ground reference line 56 but rather is connected to node or junction 64, between diodes 22 and 24, similar to resonant capacitor 52. This configuration increases the current available which may be fed back to the circuit input, and is useful for improving the power factor of the circuit for embodiments having high-power factor requirements. In simple triac-dimming circuits a high-power factor is not an essential requirement. Rather, in these environments the primary goal is to have the minimal triac current maintained.

In the embodiment of FIG. 3, input current to maintain the minimum triac holding current is obtained not only by input power source 12, but is also obtained from a portion of resonant current supplied by capacitor 52, and current from lamp 14.

Figure 4:
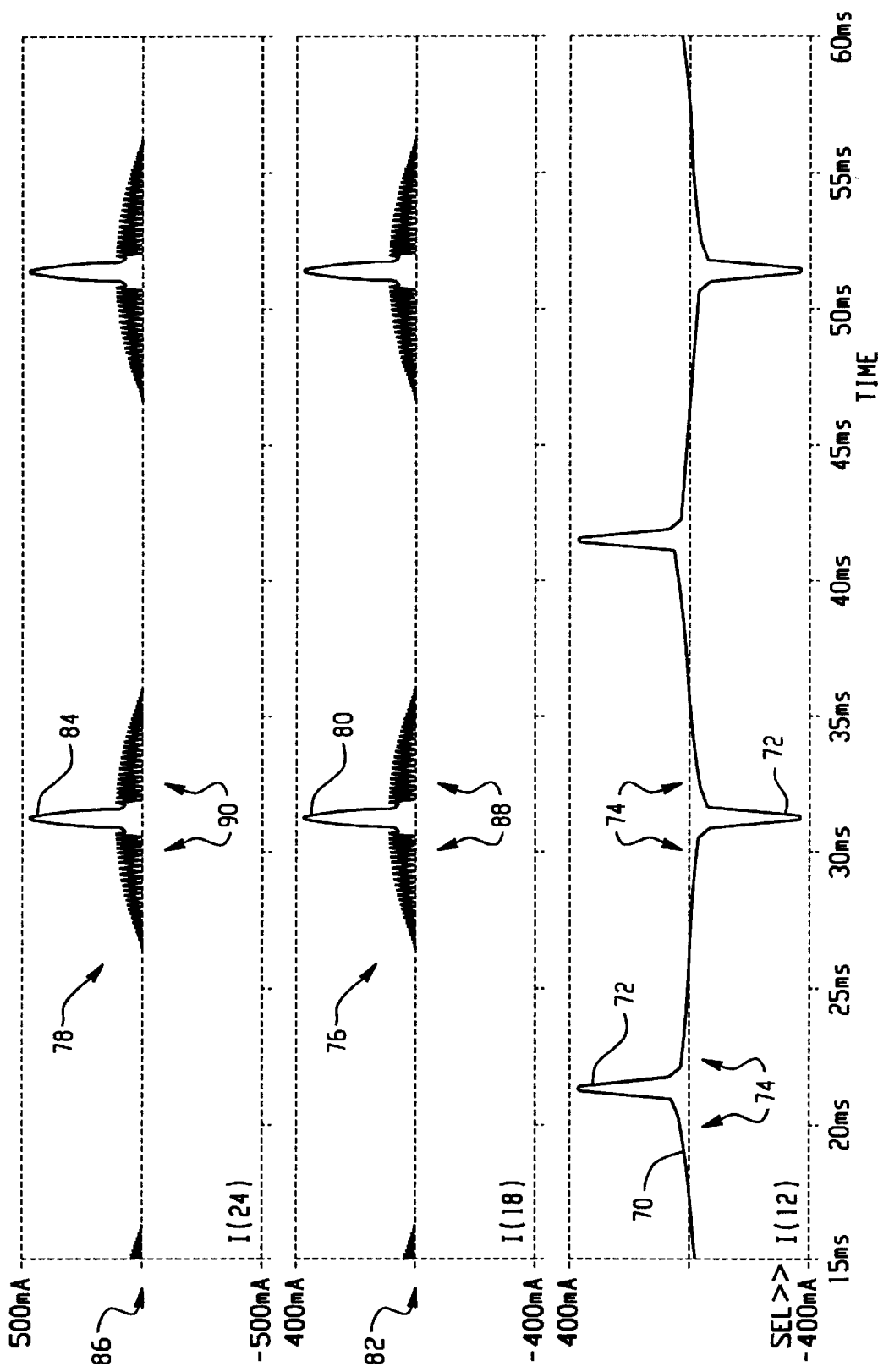
FIG. 4 are waveforms of the line current, current through the diodes of the rectifier.

Selected circuit operation is shown more particularly in connection with FIG. 4, where the input line current waveform 70 includes two distinct portions, a peak charge current portion 72 and holding current portion 74. FIG. 4 displays the relevant waveforms for a time period from 15 ms–60 ms. Peak charge current 72 is obtained by a.c. input source 12. During this time, capacitor 58 is directly charged by the a.c. source 12.

Holding current 74 is represented by the shoulder portion of peak charging current 72. This holding current must be equal to at least the minimum triac-holding current necessary to maintain the triac in an operational state. In circuit 10 of FIG. 2 the value of holding current 74 is dependent on the current developed at resonant capacitor 52. In circuit 10 of FIG. 3 holding current is dependent on resonant capacitor 52 and lamp 14.

Operation of rectifier 16 varies dependent upon the mode of circuit operation. During peak charging, diode 18 and diode 24 are simultaneously conducting, on the positive half-cycle of a.c. source 12. On the negative half-cycle of a.c. source 12, diode 20 and diode 22 are simultaneously conducting.

During the holding current period, only a single diode will be conducting at any point in time. For example, when the a.c. input source is on a positive half-cycle, and diode 18 is conducting, diode 24 will be off, and when diode 24 is conducting, diode 18 will be off. Therefore, out of four possible diodes being operational, during the holding current period only a single diode of the four will be active at a time. Therefore, on the negative a.c. half-cycle, when diode 20 is active, diode 22 will be inactive, and when diode 22 is active, diode 20 will be inactive. It is to be noted that diodes 18–24 will be fast-recovery diodes in these embodiments.

Returning attention to FIG. 3, in this embodiment, both resonant capacitor 52 and lamp 14 are connected back to the input circuit between diodes 22 and 24 at node 64. Alternatively, both resonant capacitor 52 and lamp 14 may be connected between diodes 18 and 20. By this configuration, in addition to maintaining the minimal triac holding current with a good crest factor, and a low THD, a good power factor is also obtained due to the added current from lamp 14.

During the peak charge portion 72 of waveform 70, the input from the a.c. source 12 is higher than the bus voltage across capacitor 58. Therefore, a.c. source 12 is directly charging up capacitor 58 through the power lines. During the holding current portion 74, the a.c. input source 12 has dropped below the charge value on capacitor 58. At this point, the current from capacitor 52 is providing the major portion of input current. The amount of current supplied by capacitor 52 is dependent upon the size of the capacitor in relationship to the other components of circuit 10. The emi filter 28 ensures that the high-frequency component of a.c. source 12 is removed from the circuit input signals.

The turns ratio of the transformer formed by windings 44 and 46 is required to be of a ratio which allows for adequate feedback voltage during the starting of the circuit.

Returning to FIG. 4, waveform 76 depicts the current through diode 18. As can be seen, during a peak charge portion of waveform 70, the current through diode 18 is also at a peak 80, constantly above ground reference 82. This means diode 18 is in a conducting state during the peak charging portion of waveform 70. Waveform 78 representing current through diode 24 functions in a similar manner. Particularly, during the peak charging period of waveform 70, the diode 24 is in an ON state resulting in a peak output 84, which is constantly above ground reference 86. It is noted that diodes 18 and 24 are conducting during the line voltage, i.e. the output of the a.c. source 12, during its negative half cycles. It is to be understood that similar waveforms exist for diodes 20 and 22 during the positive half cycles of a.c. source 12.

Waveforms 76 and 78, illustrate that at the shoulder portions 88 and 90 respectively (i.e. during the holding current portion 74 of waveform 70) ON/OFF transitions are occurring where current through respective diodes 18 and 24 are going to a ground reference 82, 86 representing an OFF state. Such action indicates that switching ON and OFF action of diodes 18 and 24 is occurring during the holding current portion 74 of line current 70.

Figure 5:
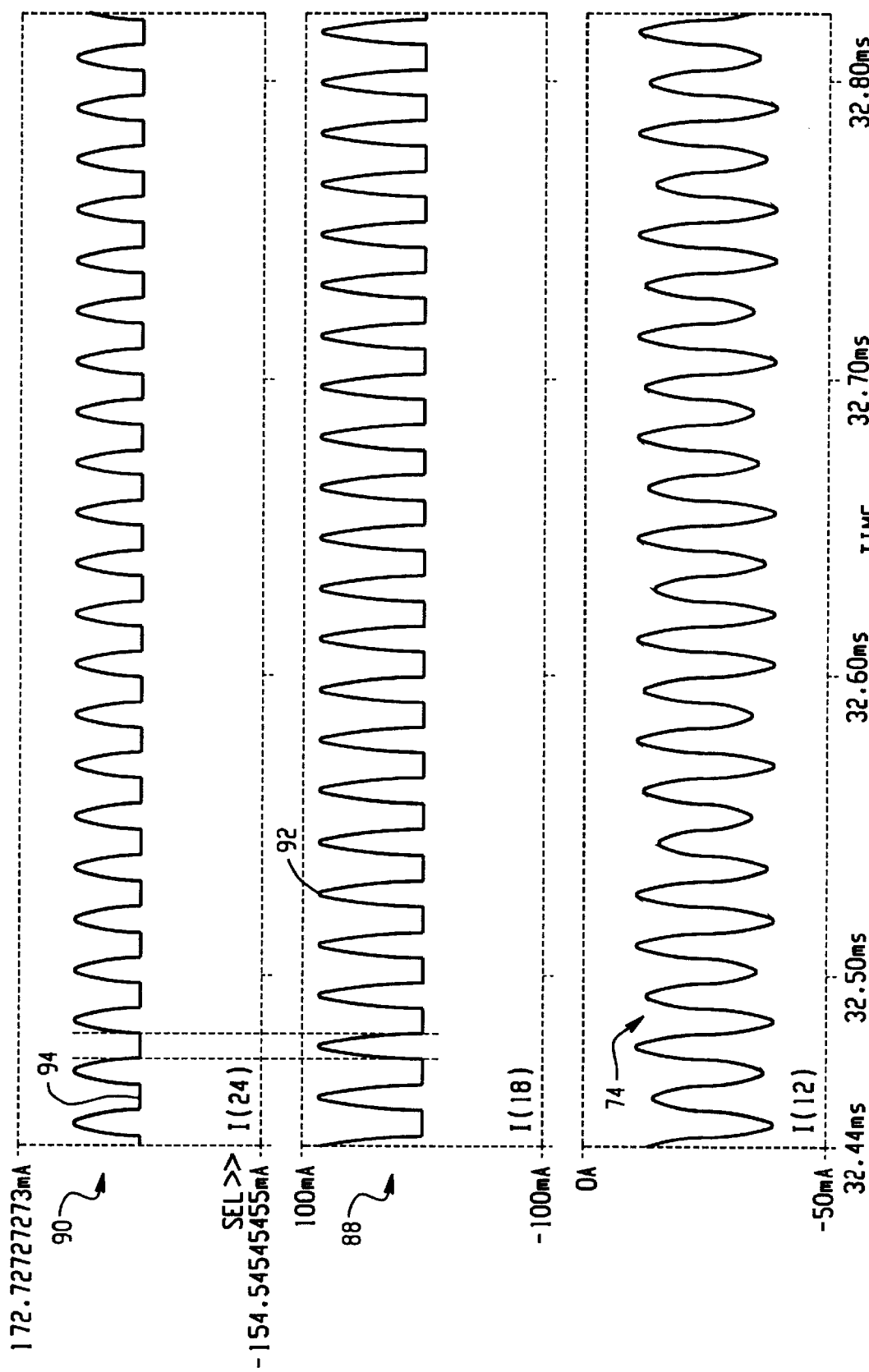
FIG. 5 illustrates portions of the waveforms of FIG. 4 with an expanded time scale.

This action is more clearly depicted by FIG. 5, which is an expanded time line (from 32.44 ms–32.80 ms) of the shoulder portions 74, 88, 90 of waveforms 70, 76 and 78 of FIG. 4. In particular, as shoulder portions 88 and 90 associated with the switching action of diodes 18 and 24 are observed, it is seen that when waveform 88 is high 92, the waveform 90 is low at ground reference 94. This confirms that diodes 18 and 24 alternate between ON and OFF states so that only a single diode of rectifier 16 is active (since diodes 20 and 22 are inactive when waveform 70 is on its negative half-cycle).

Figure 6:
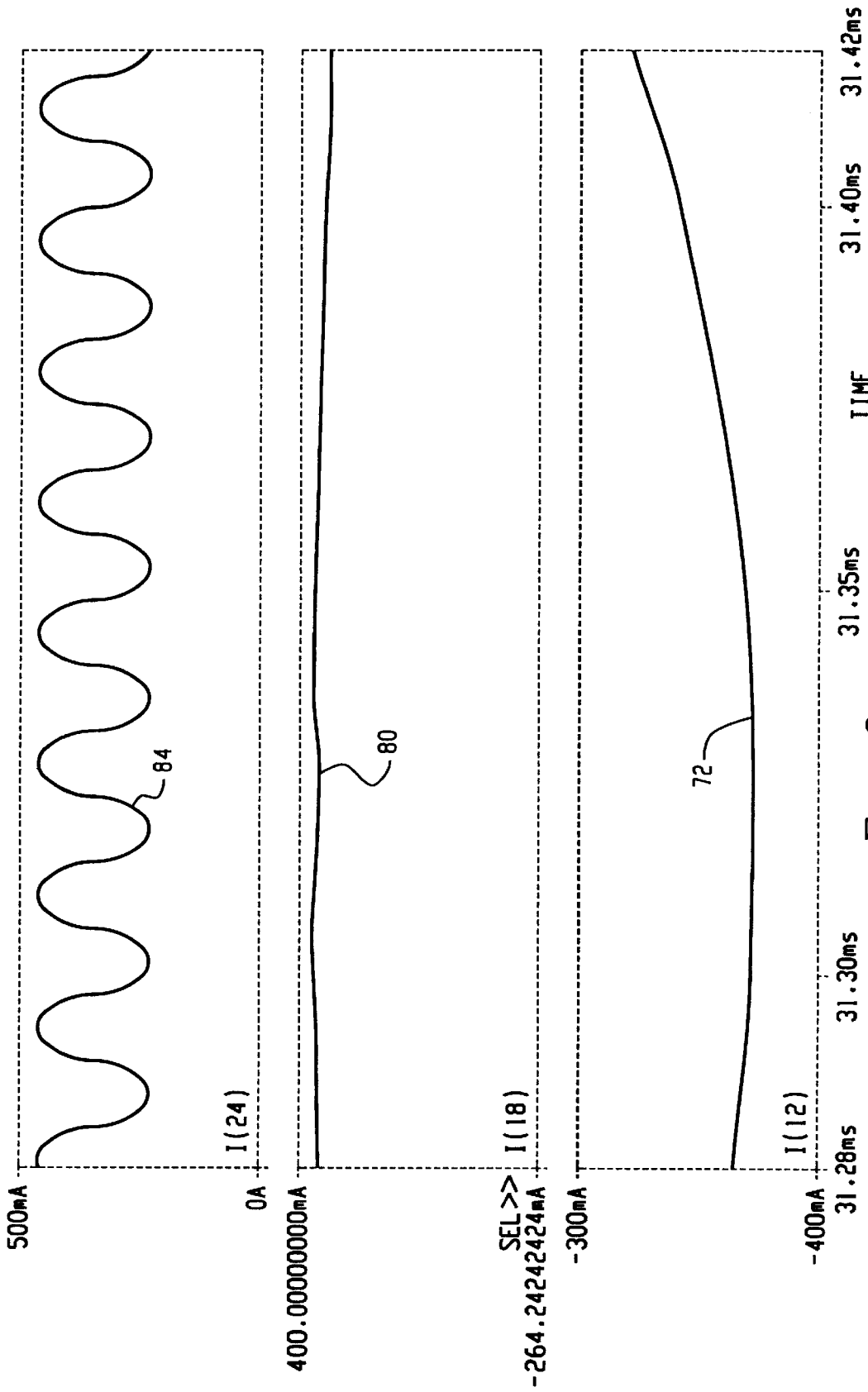
FIG. 6 depicts a third time-scale version of the waveforms of FIG. 4.

FIG. 6 illustrates an expanded timeline for waveform of peak charging portions 72, 80 and 84 (from 31.28 ms to 31.42 ms) when the line current 70 is in the peak charging mode. During this time current through diode 18, i.e. waveform 80, and current through diode 24, i.e. waveform 84, are both constantly conducting as they are above ground reference. It is noted that the waveform portion 84 through diode 24 includes an a.c. portion. This waveform still, however, does not approach the ground reference of zero amps. The reason the current through diode 24 has an a.c. portion is that it receives some of the resonant current, while the diode 18 has less a.c. current due to the capacitor 52 being connected at junction 64.

As previously noted, increased power factor is obtained by the circuit configuration shown in FIG. 3. To increase the circuit power factor, the shoulder portions 74, 88, 90 of the current waveforms 70, 76, 78 of FIG. 4 are increased, to shape the waveforms to more sinusoidal forms. Increasing the input waveforms to a more sinusoidal form, and by having it in-phase with the line voltage, increases the power factor of circuit 10. In order to accomplish this sinusoidal form, it is necessary to increase the input current available during the non-peak charging mode. Connecting lamp 14 to deliver its current to the input circuit adds this lamp current to the input current from capacitor 52. To further increase the value of this input current from capacitor 52, the values selected for capacitor elements 50 and 52 may be adjusted in relationship to each other such that more of the resonant current flows through capacitor 50.

Figure 2:
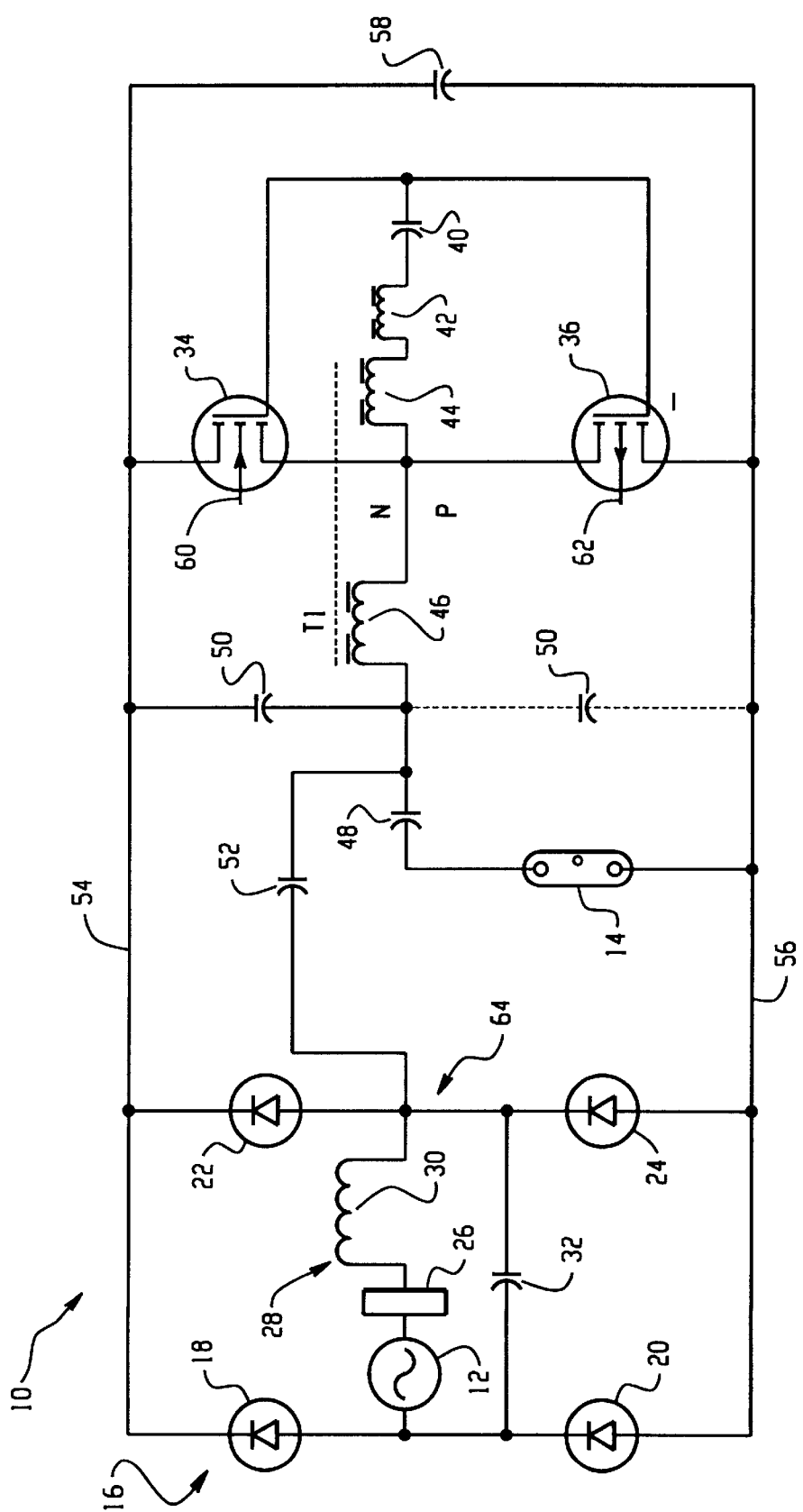
FIG. 2 sets forth a first embodiment of the present invention wherein the lamp is connected to ground reference of the circuit.

Thus, the circuit of FIG. 3, achieves an increased power factor compared with the circuit of FIG. 2.

The invention has been described with reference to the preferred embodiments. Obviously, modifications and alterations will occur to others upon a reading and understanding of the specification. It is intended that all such modifications and alterations are to be included insofar as they come within the scope of the appended claims or the equivalents thereof.

What is claimed is:

1. An electronic ballast configured to receive input from a power source, to control operation of a lamp connected to the electronic ballast, the electronic ballast comprising:

a positive side bus voltage line;

a ground reference line;

an input section connected to the power source, the positive side bus voltage line and the ground reference line;

a switching network;

a resonant network connected to the input section and the switching network, the resonant network including,
a gate drive network receiving signals from a portion of the resonant network, for controlling operation of the switching network using the received signals; and
a resonant switching network of the resonant network including:
a first resonant capacitor connected to at least one of the positive side bus voltage line and the ground reference line, and
a second resonant capacitor connected to the first resonant capacitor and to the input section, wherein at least a portion of resonant current from the second resonant capacitor is supplied to the input section.

2. The invention according to claim 1 further including a triac dimmer connected between the power source and the input section.

3. The invention according to claim 1 wherein the first resonant capacitor and the second resonant capacitor are sized in relationship to each other to provide a selected portion of the resonant current back to the input from the second resonant capacitor.

4. The invention according to claim 1 wherein the lamp is connected at a first end to the second resonant capacitor, and at a second end to the ground reference line.

5. The invention according to claim 1 wherein the lamp is connected in series with the input section, whereby current through the lamp is supplied back to the input section.

6. The invention according to claim 6 wherein the ballast operates in at least one of a peak charging mode and a triac current holding mode.

7. The invention according to claim 1 wherein the input section includes a full diode rectifier bridge.

8. The invention according to claim 7 wherein the ballast operates in at least one of a peak charging mode and a triac current holding mode.

9. The invention according to claim 8 wherein when operating in the triac current holding mode, the ballast is configured such that only a single diode of the full diode rectifier bridge is operational at a time.

10. An electronic ballast configured to receive input from a power source, to control operation of a lamp connected to the electronic ballast, the electronic ballast comprising:

a positive side bus voltage line;

a ground reference line;

an input section connected to the power source, the positive side bus voltage line and the ground reference line, the input section including a full-bridge diode rectifier;

a complementary pair switching network;

a resonant network connected to the input section and the switching network, the resonant network including a gate drive network receiving signals from a portion of the resonant network, for controlling operation of the switching network using the received signals;

a triac dimmer connected between the power source and the input section; and a resonant switching network of the resonant network, including, a first resonant capacitor connected to the resonant network and to at least one of the positive side bus voltage line and the ground reference line, and a second resonant capacitor connected to the first resonant capacitor and to the input section, wherein at least a portion of resonant current from the second resonant capacitor is supplied to the input section wherein the portion of resonant current is sufficient to maintain a minimal triac holding current.

11. The invention according to claim 10 wherein the first resonant capacitor and the second resonant capacitor are sized in relationship to each other to provide a selected portion of the resonant current back to the input from the second resonant capacitor.

12. The invention according to claim 10 wherein the lamp is connected at a first end to the second resonant capacitor, and at a second end to the ground reference line.

13. The invention according to claim 10 wherein the lamp is connected in series with the input section, whereby current through the lamp is supplied to the input section.

14. The invention according to claim 10 wherein the input section includes a full diode rectifier bridge.

* * * * *